United States Patent
Kang

(10) Patent No.: US 12,339,924 B1
(45) Date of Patent: Jun. 24, 2025

(54) DATA OPERATION METHOD AND DATA OPERATION DEVICE SUPPORTING THE SAME

(71) Applicant: REBELLIONS INC., Seongnam-si (KR)

(72) Inventor: Minhoo Kang, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/945,420

(22) Filed: Nov. 12, 2024

(30) Foreign Application Priority Data

Dec. 26, 2023 (KR) .......................... 10-2023-0191619

(51) Int. Cl.
    *G06F 17/16* (2006.01)
(52) U.S. Cl.
    CPC .................................... *G06F 17/16* (2013.01)
(58) Field of Classification Search
    CPC ....................................................... G06F 17/16
    USPC ....................................................... 708/607
    See application file for complete search history.

(56) References Cited

U.S. PATENT DOCUMENTS

| 2024/0004954 A1* | 1/2024 | Du | ............................ G06F 7/32 |
| 2024/0184848 A1* | 6/2024 | Du | ........................... G06F 17/16 |

FOREIGN PATENT DOCUMENTS

| KR | 10-2019-0104223 A | 9/2019 |
| KR | 10-2023-0071481 A | 5/2023 |
| WO | 2018/134740 A2 | 7/2018 |

* cited by examiner

*Primary Examiner* — Tan V Mai
(74) *Attorney, Agent, or Firm* — BROADVIEW IP LAW, PC

(57) ABSTRACT

A data operation device is disclosed. The data operation device comprises at least one memory configured to store a first data set represented as a first sparse matrix and a second data set represented as a second matrix, a vector unit configured to perform a row-wise product-based matrix multiplication operation based on the first sparse matrix and the second matrix and output a third data set represented as a third matrix, and a memory load unit configured to load into the vector unit first vector data associated with a row of the first sparse matrix from the first data set, and second vector data associated with a row of the second matrix that corresponds to an order of non-zero vector elements included in the first vector data from the second data set.

17 Claims, 15 Drawing Sheets

DATA OPERATION METHOD AND DATA OPERATION DEVICE SUPPORTING THE SAME

CROSS-REFERENCE TO RELATED APPLICATION

This application claims priority to Korean Patent Application No. 10-2023-0191619, filed in the Korean Intellectual Property Office on Dec. 26, 2023, the entire contents of which are hereby incorporated by reference.

BACKGROUND

Field

The present disclosure relates to a data operation method and a data operation device supporting the same.

Description of Related Art

The performance of the operation devices continues to be improved, and the operations using the operation devices are also used in various ways. In particular, processing large-scale operations involves performing a matrix-to-matrix operation (e.g., matrix-to-matrix multiplication, etc.) with the operation device. This is because data requiring the large-scale operations, such as 3D graphic acceleration data, wireless network data, biographical data, etc. are implemented in the form of a matrix with vector values.

The matrix-to-matrix multiplication is the most basic operation in many fields such as big data analysis, machine learning, image processing, etc. In particular, since the network structure of machine learning requires enormous matrix-to-matrix multiplications, performing the matrix-to-matrix multiplication more quickly and efficiently is a critical issue that determines the performance of machine learning. Accordingly, there is a demand for the development of data operation technology to perform matrix-to-matrix multiplication more quickly and efficiently.

SUMMARY

In order to solve one or more problems (e.g., the problems described above and/or other problems not explicitly described herein), the present disclosure provides a data operation method and a data operation device supporting the same.

According to an aspect of the present disclosure, a data operation device may comprise at least one memory configured to store a first data set represented as a first sparse matrix and a second data set represented as a second matrix, a vector unit configured to perform a row-wise product-based matrix multiplication operation based on the first sparse matrix and the second matrix and output a third data set represented as a third matrix, and a memory load unit configured to load into the vector unit first vector data associated with a row of the first sparse matrix from the first data set, and second vector data associated with a row of the second matrix that corresponds to an order of non-zero vector elements included in the first vector data from the second data set.

According to an aspect of the present disclosure, the first data set may include a value of 0 in the first sparse matrix.

According to an aspect of the present disclosure, for the first data set, a sum of values of all vector elements included in vector data associated with any one row of the first sparse matrix may be 1.

According to an aspect of the present disclosure, the vector unit may be configured to identify indices corresponding to the order of non-zero vector elements included in the first vector data in response to loading the first vector data, generate third vector data including vector elements having the identified indices as their values, and transmit the third vector data to the memory load unit.

According to an aspect of the present disclosure, the indices may correspond to an order of non-zero vector elements included in the first vector data that have values equal to or greater than a specified value.

According to an aspect of the present disclosure, the memory load unit may be configured to load into the vector unit the second vector data associated with a row of the second matrix that corresponds to values of the vector elements of the third vector data from the second data set in response to receiving the third vector data.

According to an aspect of the present disclosure, the memory load unit may be configured to load into the vector unit fourth vector data associated with a row different from the row of the first sparse matrix from the first data set together with the first vector data.

According to an aspect of the present disclosure, the vector unit may be configured to identify a first index corresponding to the order of the non-zero vector elements included in the first vector data, identify a second index corresponding to an order of non-zero vector elements included in the fourth vector data, generate fifth vector data including a first vector element having the first index as its value and a second vector element having the second index as its value, wherein the fifth vector data includes either the first vector element or the second vector element only, if the first vector element and the second vector element have the same value, and transmit the fifth vector data to the memory load unit.

According to an aspect of the present disclosure, the first index may correspond to an order of non-zero vector elements included in the first vector data that have values equal to or greater than a specified value, and the second index may correspond to an order of vector elements included in the fourth vector data that have values equal to or greater than the specified value.

According to an aspect of the present disclosure, the memory load unit may be configured to load into the vector unit the second vector data associated with a row of the second matrix that corresponds to values of the vector elements of the third vector data from the second data set in response to receiving the third vector data.

According to an aspect of the present disclosure, the vector unit may be configured to multiply values of the non-zero vector elements included in the first vector data by the second vector data and accumulate the multiplication results in vector data of a row of rows the third matrix that corresponds to the first vector data.

According to an aspect of the present disclosure, a data operation method executed by a data operation device comprising at least one memory and a vector unit may comprise loading first vector data associated with a row of the first sparse matrix into the vector unit from a first data set stored in the at least one memory and represented as a first sparse matrix, loading second vector data associated with a row of the second matrix corresponding to an order of non-zero vector elements included in the first vector data into the vector unit from a second data set stored in the at least one memory and represented as a second matrix, and performing, through the vector unit, a row-wise product-based matrix multiplication operation based on the first sparse matrix and the second matrix and outputting a third data set represented as a third matrix.

According to an aspect of the present disclosure, the loading the second vector data into the vector unit may further comprise identifying indices corresponding to the order of the non-zero vector elements included in the first vector data, generating third vector data including vector elements having the identified indices as their values, and loading the second vector data into the vector unit based on the third vector data.

According to an aspect of the present disclosure, the indices may correspond to an order of non-zero vector elements included in the first vector data that have values equal to or greater than a specified value.

According to an aspect of the present disclosure, the loading the second vector data into the vector unit based on the third vector data may comprise loading into the vector unit the second vector data associated with a row of the second matrix that corresponds to values of the vector elements of the third vector data from the second data set.

According to an aspect of the present disclosure, the data operation method may further comprise loading into the vector unit fourth vector data associated with a row different from the row of the first sparse matrix from the first data set together with the first vector data.

According to an aspect of the present disclosure, the loading the second vector data into the vector unit may comprise identifying a first index corresponding to the order of non-zero vector elements included in the first vector data, identifying a second index corresponding to an order of non-zero vector elements included in the fourth vector data, generating fifth vector data including a first vector element having the first index as its value and a second vector element having the second index as its value in a non-overlapping manner, and loading the second vector data into the vector unit based on the fifth vector data.

According to an aspect of the present disclosure, the first index may correspond to an order of non-zero vector elements included in the first vector data that have values equal to or greater than a specified value, and the second index may correspond to an order of vector elements included in the fourth vector data that have values equal to or greater than the specified value.

According to an aspect of the present disclosure, the loading the second vector data into the vector unit based on the fifth vector data may comprise loading into the vector unit the second vector data associated with a row of the second matrix that corresponds to values of the vector elements of the fifth vector data from the second data set.

According to an aspect of the present disclosure, the outputting the third data set may comprise multiplying values of the non-zero vector elements included in the first vector data by the second vector data and accumulating the multiplication results in vector data of a row of rows of the third matrix that corresponds to the first vector data.

According to some aspects of the present disclosure, by supporting a row-wise product-based matrix multiplication on a sparse matrix stored in a dense format, it is possible to improve the speed of memory access and operation on a data set represented as an input matrix of matrix multiplication operation, thereby enabling efficient matrix operations.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
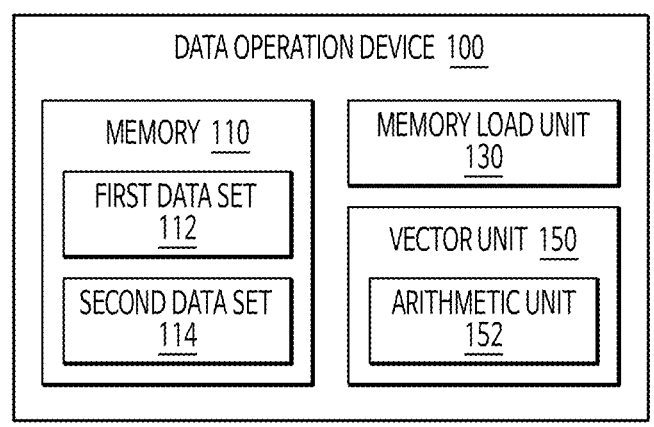
FIG. 1 is a diagram provided to explain a configuration of a data operation device.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals.

In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

Hereinafter, various examples of the present disclosure will be described in detail with reference to the accompanying drawings.

FIG. 1 is a diagram provided to explain a configuration of a data operation device. Referring to FIG. 1, a data operation device 100 may include a memory 110, a memory load unit 130, and a vector unit 150. However, the configuration of the data operation device 100 is not limited to the above. According to various aspects, the data operation device 100 may omit at least one of the components described above, and may further include at least one other component.

The memory 110 may store various data used by at least one other component (e.g., the vector unit 150) of the operation device 100. For example, the data may include input data or output data for software (e.g., a program) and instructions related to the same. The memory 110 may store a data set in a matrix representation. For example, the memory 110 may store a first data set 112 represented as a first sparse matrix and a second data set 114 represented as a second matrix. The sparse matrix may represent a matrix in which most element values are zero. Conversely, a dense matrix may represent a matrix in which most element values have non-zero values. The second matrix may be a sparse matrix or a dense matrix. In the following description, a modifier "first" in front of the word "matrix" or "sparse matrix" may represent an input matrix that is the first or left factor in a matrix multiplication operation (e.g., general matrix multiplication (GEMM)), and a modifier "second" may represent an input matrix that is the second or right factor.

A data set (e.g., the first data set 112) represented as the sparse matrix may be stored in a dense format when stored in the memory 110. For example, an element having an element value of 0 may also be stored in the memory 110. In some aspects, when a data set represented as the sparse matrix is stored in the memory 110, all elements of the sparse matrix may be stored in the memory 110. Conversely, the fact that the data set represented as the matrix is stored in the memory 110 in a sparse format may indicate that only the corresponding element value and location information are stored in the memory 110 for elements with non-zero element values. Examples of a method of storing in a sparse format include Coordinate (COO), Compressed Sparse Row (CSR), Compressed Sparse Column (CSC), etc.

The memory 110 may include any non-transitory computer-readable recording medium. The memory 110 may include a permanent mass storage device such as disk drive, solid state drive (SSD), flash memory, etc. As another example, a non-destructive mass storage device such as ROM, SSD, flash memory, disk drive, etc. may be included in the operation device 100 as a separate permanent storage device that is distinct from the memory 110. In addition, the memory 110 may store an operating system and at least one program code (e.g., instructions such as data operations installed and driven in the operation device 100). The memory 110 may include at least one of dynamic random access memory (DRAM), cache memory, shared memory (SHM), or a scratchpad (SP). In FIG. 1, the memory 110 is illustrated as a single memory, but this is only for convenience of description, and the memory 110 may include a plurality of memories and/or buffer memories.

The memory load unit 130 may load any of the data stored in the memory 110 that requires operations to be performed thereon into the vector unit 150. For example, the memory load unit 130 may load at least a part of the first data set 112 and at least a part of the second data set 114 stored in the memory 110 into the vector unit 150. The memory load unit 130 may load into the vector unit 150 vector data (hereinafter, referred to as first vector data) associated with a row of the first sparse matrix from the first data set 112, and vector data (hereinafter, referred to as second vector data) associated with a row of the second matrix from the second data set 114 such that a row-wise product-based matrix multiplication operation is performed through the vector unit 150. In order to accelerate the row-wise product-based matrix multiplication operation, the memory load unit 130 may load into the vector unit 150 the first vector data associated with the row of the first sparse matrix from the first data set 112, and the second vector data associated with the row of the second matrix that corresponds to the order of non-zero vector elements included in the first vector data from the second data set 114. For example, if the first vector data associated with the n-th row (n is a natural number) of the first sparse matrix is loaded, and if any of the vector elements of the loaded first vector data that corresponds to the m-th order (or column) (m is a natural number) has a non-zero value, the memory load unit 130 may load the second vector data associated with the m-th row of the rows of the second matrix into the vector unit 150. In this way, when the second vector data associated with the row of the second matrix is loaded into the vector unit 150, among the first vector data associated with the row of the first sparse matrix, the vector data associated with the row of the second matrix corresponding to the order of the vector elements having zero is not loaded into the vector unit 150, and as a result, the speed of the memory access and the operation may be improved and efficient matrix operation is possible.

If the first vector data associated with the row of the first sparse matrix is loaded from the first data set 112, the vector unit 150 may identify indices that correspond to the order of non-zero vector elements included in the first vector data. The vector unit 150 may generate vector data (hereinafter, referred to as third vector data) including vector elements having the identified indices as their values, and transmit the generated third vector data to the memory load unit 130. In this case, in response to receiving the third vector data, the memory load unit 130 may load into the vector unit 150 the second vector data associated with the row of the second matrix that corresponds to the values of the vector elements of the third vector data from the second data set 114.

The vector unit 150 may apply a threshold to the vector data. For example, if the first vector data associated with the row of the first sparse matrix is loaded from the first data set 112, the vector unit 150 may apply the threshold to the first vector data. More specifically, the vector unit 150 may set the value of the vector element included in the first vector data to zero if the vector element is less than a specified value to zero. In this case, the indices may correspond to the order of the non-zero vector elements included in the first vector data that have values equal to or greater than the specified value. According to another aspect, when it is mentioned that the vector unit 150 applies the threshold to the first vector data, it may mean that the vector unit 150, in the process of identifying indices, identifies the indices that correspond to the order of the non-zero vector elements included in the first vector data that have values equal to or greater than the specified value. In this case, the vector unit 150 may not set the value of the vector element included in the first vector data to zero if the vector data is less than the specified value.

The vector unit 150 may perform operations on the loaded data using an arithmetic unit 152. The arithmetic unit 152 may include, for example, a Fused Multiply-Add (FMA) capable of performing a scalar-vector operation. FMA is an arithmetic unit that can perform floating-point multiplication and addition at once, and it may add a value obtained by multiplying two numbers to another value in the accumulator.

The vector unit 150 may perform a row-wise product-based matrix multiplication operation using the arithmetic unit 152. For example, the vector unit 150 may multiply the values of the non-zero vector elements included in the first vector data by the second vector data and accumulate the multiplication results in the vector data of a row of the rows of the output matrix (hereinafter referred to as a third matrix) that corresponds to the first vector data. For example, if the first vector data associated with the n-th row (n is a natural number) of the first sparse matrix is loaded and if the vector element of the loaded first vector data that corresponds to the m-th order (or column) (m is a natural number) has a non-zero value, the second vector data associated with the m-th row of the rows of the second matrix may be loaded into the vector unit 150. In this case, the vector unit 150 may multiply the values of the non-zero vector elements included in the first vector data, that is, the vector elements corresponding to the m-th order, by the second vector data and accumulate the multiplication results in the vector data of the row (that is, the n-th row) of the rows of the third matrix that corresponds to the first vector data. The vector unit 150 may output a third data set represented as a third matrix.

Since the process of loading the vector data associated with the rows of matrices into the vector unit 150 is repeatedly performed as in a loop, a loop unrolling function may be performed to improve the speed of memory access and operation. In more detail, the memory load unit 130 may load into the vector unit 150 the vector data associated with a plurality of rows of the first sparse matrix from the first data set 112. For example, the memory load unit 130 may load into the vector unit 150 vector data (hereinafter referred to as fourth vector data) associated with a row different from the n-th row (n is a natural number) from the first data set 112, together with the vector data (hereinafter referred to as the first vector data) associated with the n-th row (n is a natural number) of the first sparse matrix. That is, the memory load unit 130 may additionally load the fourth vector data into the vector unit 150 together with the first vector data. However, the number of additional vector data to be loaded is not limited to the above. According to various aspects, the memory load unit 130 may additionally load at least one vector data into the vector unit 150 in addition to the fourth vector data. In this case, the at least one additionally loaded vector data may include vector data associated with a row adjacent to the row of the rows of the first sparse matrix that corresponds to the first vector data and/or the fourth vector data. For example, if the first vector data is vector data associated with the n-th row of the first sparse matrix and the fourth vector data is vector data associated with the n+1-th row of the first sparse matrix, at least one additional vector data to be loaded may include vector data associated with the n+2-th row and/or vector data associated with the n+3-th row.

In this way, when the loop unrolling function is performed, the vector unit 150 may integrate indices corresponding to the order of non-zero vector elements included in the plurality of vector data. In more detail, the vector unit 150 may identify a plurality of indices that correspond to the order of non-zero vector elements included in each of the loaded plurality of vector data. For example, if the first and fourth vector data is loaded into the vector unit 150, the vector unit 150 may identify a first index that corresponds to the order of non-zero vector elements included in the first vector data, and identify a second index that corresponds to the order of non-zero vector elements included in the fourth vector data. The vector unit 150 may generate vector data (hereinafter, referred to as fifth vector data) including a plurality of vector elements having each of the plurality of indices as their value in a non-overlapping manner. For example, the vector unit 150 may generate the fifth vector data including first vector elements having the first index as their value and second vector elements having the second index as their value in a non-overlapping manner. In other words, the vector unit 150 may generate the fifth vector data including the first vector elements having the first index as their values and the second vector elements having the second index as their values, but the fifth vector data may include either the first vector elements or the second vector elements only, if the first vector elements and the second vector elements have the same value. The vector unit 150 may transmit the generated fifth vector data to the memory load unit 130. In this case, in response to receiving the fifth vector data, the memory load unit 130 may load into the vector unit 150 the second vector data associated with the row of the second matrix that corresponds to the values of the vector elements of the fifth vector data from the second data set 114.

The vector unit 150 may apply a threshold to a plurality of vector data. For example, if a plurality of vector data associated with a plurality of rows of the first sparse matrix is loaded from the first data set 112, the vector unit 150 may apply a threshold to the plurality of vector data. More specifically, the vector unit 150 may set the vector element included in each of the plurality of vector data to zero if the vector element is less than the specified value. In this case, for example, the first index may correspond to the order of the non-zero vector elements included in the first vector data and having values equal to or greater than the specified value, and the second index may correspond to the order of non-zero vector elements included in the fourth vector data and having values equal to or greater than the specified value. According to another aspect, when it is mentioned that the vector unit 150 applies a threshold to a plurality of vector data, it may mean that the vector unit 150, in the process of identifying a plurality of indices, identifies indices that correspond to the order of the non-zero vector elements included in each of the plurality of vector data and having values equal to or greater than the specified value. In this case, the vector unit 150 may not set the value of the vector element included in each of the plurality of vector data to zero if the vector element is less than the specified value.

It is illustrated above that, among the input matrices of matrix multiplication operations performed through the vector unit 150, the input matrix that is the first or left factor is a sparse matrix, and the input matrix that is the second or right factor is a sparse matrix or a dense matrix (e.g., first sparse matrix and second matrix), but aspects are not limited thereto. In another aspect, the input matrix that is the first or left factor may be the dense matrix rather than the sparse matrix, and the input matrix that is the second or right factor may be the sparse matrix (e.g., the first matrix and the second sparse matrix), and in this case, the data operation device 100 may use transpose. For example, the data operation device 100 may generate a transpose matrix of each of the first and second sparse matrices, set the transpose matrix of the second sparse matrix as an input matrix that is the first or left factor among the input matrices, set the transpose matrix of the first matrix as an input matrix that is the second or right factor among the input matrices, perform the matrix multiplication operations through the vector unit 150, and generate a transpose matrix of the result matrix and provide the generated transpose matrix as the final output matrix.

The row-wise product-based matrix multiplication operation based on the first sparse matrix and the second matrix described above may be used in various fields. For example, in an attention mechanism, it is possible to calculate an attention value by computing the weighted sum of attention weight and hidden state of each encoder, and a softmax function may be used in the process of calculating the attention weight. The softmax function is provided to obtain a probability distribution, in which the sum of the output values is 1, and most of the output values may be zero or have values close to zero except for a specific value. Accordingly, the attention weight calculated by the softmax function may be represented as a sparse matrix such that, if the data operation method according to some aspects is applied, the speed of memory access and operation may be improved and efficient data operation may be possible. As described above, if the softmax function is applied, for the first data set 112, a sum of values of all vector elements included in the vector data associated with any one row of the first sparse matrix may be 1. As another example, if a Rectified Linear Unit (ReLU) function is used as an activation function, a data set represented as a sparse matrix may be output and the data operation method according to some aspects may be applied. In addition, the data operation method according to some aspects may be applied to a graph neural network, a recommending system, etc.

Figure 2:
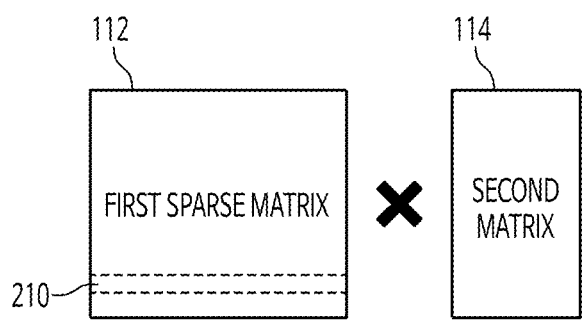
FIG. 2 is a diagram provided to explain a row-wise product-based matrix multiplication operation.

FIG. 2 is a diagram provided to explain a row-wise product-based matrix multiplication operation. Referring to FIG. 2, in the row-wise product-based matrix multiplication operation based on the first sparse matrix and the second matrix, the first sparse matrix may represent an input matrix that is the first or left factor, and the second matrix may represent the input matrix that is the second or right factor. The first sparse matrix may be a matrix in which most element values are zero, and for the data operation method according to some aspects, the first data set 112 represented as the first sparse matrix may be stored in the memory 110 in a dense format. For example, for the first data set 112, all elements including zero in the first sparse matrix may be stored in the memory 110. On the other hand, the second matrix may take any matrix form. For example, the second matrix may be a sparse matrix or a dense matrix.

For matrix multiplication operations, data requiring operations to be performed thereon is loaded into the vector unit 150, and in this process, in order to accelerate the row-wise product-based matrix multiplication operation, the memory load unit 130 may load first vector data 210 associated with the row of the first sparse matrix from the first data set 112, and second vector data associated with the row of the second matrix that corresponds to the order of the non-zero vector elements included in the first vector data 210 from the second data set 114. For example, if the first vector data 210 associated with the n-th row (n is a natural number) of the first sparse matrix is loaded, and if any of the vector elements of the loaded first vector data 210 that corresponds to the m-th order (or column) (m is a natural number) has a non-zero value, the second vector data associated with the m-th row of the second matrix may be loaded. In this way, when the second vector data associated with the row of the second matrix is loaded into the vector unit 150, among the vector data associated with the row of the first sparse matrix, the vector data associated with the row of the second matrix that corresponds to the order of the vector elements having zero is not loaded into the vector unit 150, and as a result, the speed of the memory access and the operation may be improved and efficient matrix operation may be possible. Each process of the row-wise product-based matrix multiplication based on the first sparse matrix and the second matrix will be described in detail below with reference to FIGS. 3 to 12.

Figure 3:
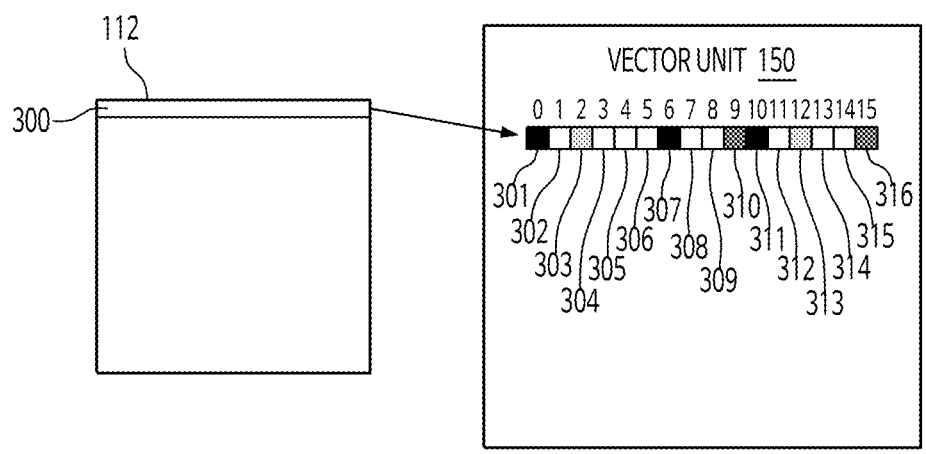
FIG. 3 is a diagram provided to explain a method for loading the vector data associated with the row of the first sparse matrix into the vector unit.

FIG. 3 is a diagram provided to explain a method for loading the vector data associated with the row of the first sparse matrix into the vector unit. Referring to FIG. 3, the memory load unit 130 may load any of the data stored in the memory 110 that requires operations to be performed thereon into the vector unit 150. For example, the memory load unit 130 may load into the vector unit 150 first vector data 300 associated with the row of the first sparse matrix from the first data set 112 stored in the memory 110. It is to be noted that the example of the first vector data 300 is described in detail below for continuity with the operation process already described above with reference to FIGS. 4 to 8, but this is only an example, and the number and value of the vector elements included in the first vector data 300 are not limited thereto. The first vector data 300 may include, for example, 16 vector elements 301 to 316, and the vector elements 301 to 316 may be set to indices 0 to 15 in order from the first vector element 301. In addition, as illustrated in FIG. 3, a vector element 301 to 316 darker in color (closer to black) represents a larger value, and a vector element brighter in color (closer to white) represents a smaller value. For example, among the vector elements 301 to 316 included in the first vector data 300, values of the second vector element 302 (index 1), the fourth vector element 304 (index 3), the fifth vector element 305 (index 4), the sixth vector element 306 (index 5), the eighth vector element 308 (index 7), the ninth vector element 309 (index 8), the twelfth vector element 312 (index 11), the fourteenth vector element 314 (index 13), and the fifteenth vector element 315 (index 14), which are expressed in white, may be zero, and values of the first vector element 301 (index 0), the seventh vector element 307 (index 6), the tenth vector element 310 (index 9), the eleventh vector element 311 (index 10), and the sixteenth vector element 316 (index 15), which are expressed in dark color, may be greater than or equal to a specified value, and values of the third vector element 303 (index 2) and the thirteenth vector element 313 (index 12), which are expressed in non-white, but bright color, may be less than the specified value. In addition, in FIG. 3, the first vector data 300 represents vector data associated with the first row of the first sparse matrix, but this is only for convenience of explanation by following the order of rows, and aspects are not limited thereto. Since the vector data associated with all rows of the first sparse matrix is loaded, the process of loading the first vector data 300 described with reference to FIG. 3 may be repeatedly performed as in a loop. For example, the first vector data 300 may be associated with each of the rows in order from the first row to the last row of the first sparse matrix.

Figure 4:
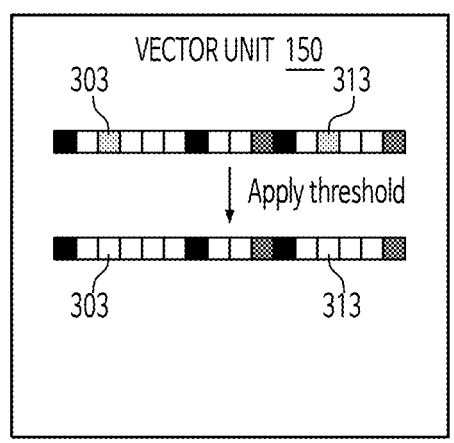
FIG. 4 is a diagram provided to explain a method for applying the threshold to the vector data.

FIG. 4 is a diagram provided to explain a method for applying the threshold to the vector data. Referring to FIG. 4, the vector unit 150 may apply the threshold to the loaded first vector data 300. For example, if the first vector data 300 associated with the row of the first sparse matrix is loaded from the first data set 112, the vector unit 150 may apply the threshold to the first vector data 300. In continuation of the process of loading the first vector data 300 described above with reference to FIG. 3, the vector unit 150 may set the value of any of the vector elements 301 to 316 included in the first vector data 300 to zero, if the vector element is less than a specified value (e.g., the threshold). For example, values of the third vector element 303 and the thirteenth vector element 313 that are less than the specified value may be set to zero. In this way, by setting the value of the vector element less than the specified value to zero, the number of second vector data corresponding to the row of the second matrix to be loaded into the vector unit 150 may be reduced, and accordingly, the speed of memory access and operation may be improved and efficient matrix operation may be possible.

Figure 5:
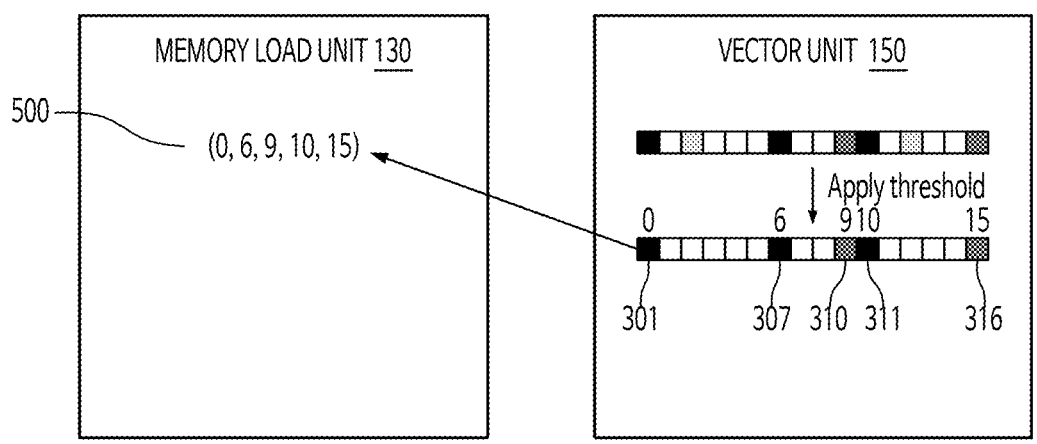
FIG. 5 is a diagram provided to explain a method for transmitting, to a memory load unit, indices corresponding to order of non-zero vector elements in the vector data.

FIG. 5 is a diagram provided to explain a method for transmitting, to a memory load unit, indices corresponding to order of non-zero vector elements in the vector data. Referring to FIG. 5, if the first vector data 300 associated with the row of the first sparse matrix is loaded from the first data set 112, the vector unit 150 may identify the indices corresponding to the order of the non-zero vector elements included in the first vector data 300. Before identifying the indices, the vector unit 150 may perform the process of applying the threshold described above with reference to FIG. 4. For example, the vector unit 150 may apply the threshold to the first vector data 300 before identifying the indices corresponding to the order of the non-zero vector elements included in the first vector data 300. Accordingly, a non-zero vector element in the first data set 112 having a value less than a specified value may not be identified with an index. In conclusion, in continuation of the process of applying the threshold of the first vector data 300 described above with reference to FIG. 4, the vector unit 150 may identify indices 0, 6, 9, 10, and 15 of the non-zero vector elements, that is, the first vector element 301, the seventh vector element 307, the tenth vector element 310, the eleventh vector element 311, and the sixteenth vector element 316 included in the first vector data 300.

The vector unit 150 may generate third vector data 500 including vector elements having the identified indices as their values. For example, the third vector data 500 may include five vector elements each having 0, 6, 9, 10, and 15 as their values. The vector unit 150 may transmit the generated third vector data 500 to the memory load unit 130.

The process of applying the threshold already described above with reference to FIG. 4 will not be redundantly described below. Accordingly, in the process of identifying the indices, the vector unit 150 may identify the indices corresponding to the order of non-zero vector elements included in the vector data 300, which have values equal to or greater than the specified value. In this case, the result value same as identifying the indices after the process of applying the threshold described with reference to FIG. 4 may be obtained. For example, the vector unit 150 may generate the third vector data 500 including five vector elements each having 0, 6, 9, 10, and 15 as their values. However, omitting the process of applying the threshold described with reference to FIG. 4 may result in improved operation speed, because resources for setting the vector element to zero may not be consumed.

Figure 6:
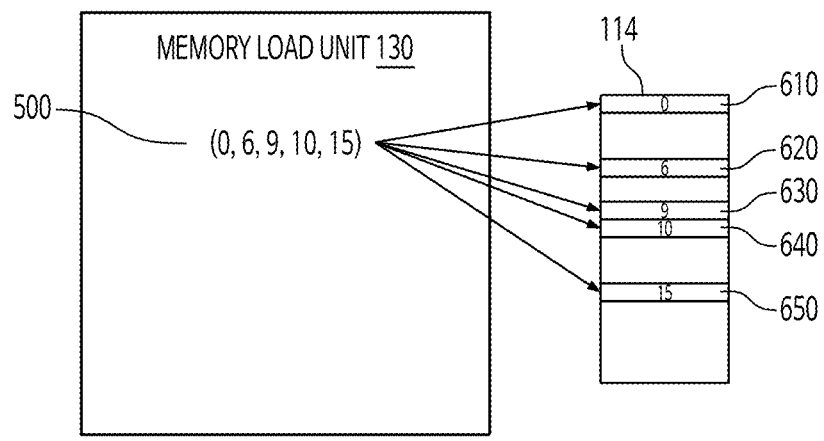
FIG. 6 is a diagram provided to explain a method for loading the vector data associated with the row of the second matrix into the vector unit using the indices.

FIG. 6 is a diagram provided to explain a method for loading the vector data associated with the row of the second matrix into the vector unit using the indices. Referring to FIG. 6, in response to receiving the third vector data 500, the memory load unit 130 may load into the vector unit 150 second vector data 610 to 650 associated with the row of the second matrix that corresponds to the values of the vector elements of the third vector data 500 from the second data set 114 stored in the memory 110. For example, in continuation of the process of generating and transmitting the third vector data 500 described above with reference to FIG. 5, the memory load unit 130 may load into the vector unit 150 a plurality of second vector data 610 to 650 associated with the first row (corresponding to 0 in order), the seventh row (corresponding to 6 in order), the tenth row (corresponding to 9 in order), the eleventh row (corresponding to 10 in order), and the sixteenth row (corresponding to 15 in order) of the second matrix corresponding to 0, 6, 9, 10, and 15, respectively, which are the values of the vector elements of the third vector data 500.

Figure 7:
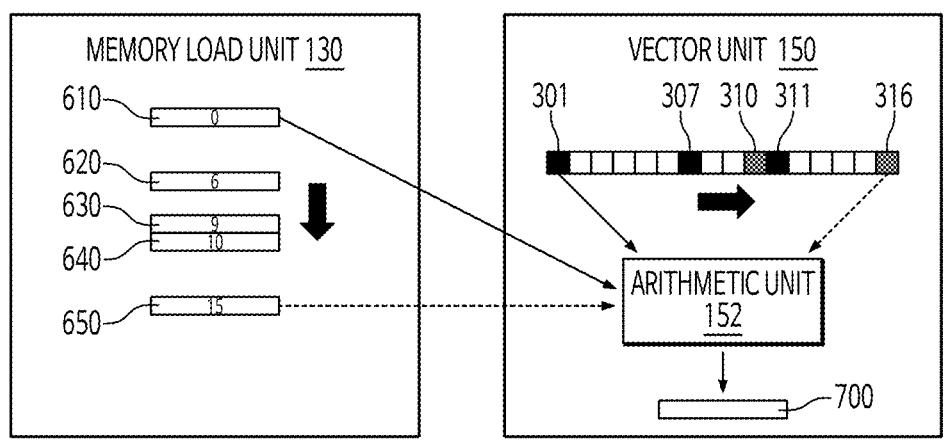
FIG. 7 is a diagram provided to explain a method for multiplying a value of a non-zero vector element of the vector data of the first sparse matrix by the vector data of the second matrix.

FIG. 7 is a diagram provided to explain a method for multiplying a value of a non-zero vector element of the vector data of the first sparse matrix by the vector data of the second matrix. Referring to FIG. 7, the vector unit 150 may perform operations on the loaded data using the arithmetic unit 152. The vector unit 150 may multiply the value of the non-zero vector element included in the first vector data 300 by the second vector data 610 to 650. For example, in continuation of the process of loading the second vector data 610 to 650 described above with reference to FIG. 6, the vector unit 150 may multiply the value of the first non-zero vector element 301 included in the first vector data 300 by the first second vector data 610 of the plurality of second vector data 610 to 650. Likewise, the vector unit 150 may multiply the value of the seventh non-zero vector element 307 included in the first vector data 300 by the second vector data 620 of the plurality of second vector data 610 to 650, multiply the value of the tenth non-zero vector element 310 included in the first vector data 300 by the third second vector data 630 of the plurality of second vector data 610 to 650, multiply the value of the eleventh non-zero vector element 311 included in the first vector data 300 by the fourth second vector data 640 of the plurality of second vector data 610 to 650, and multiply the value of the sixteenth non-zero vector element 316 included in the first vector data 300 by the fifth second vector data 650 of the plurality of second vector data 610 to 650. In this process, a vector multiplication result 700 may be accumulated.

Figure 8:
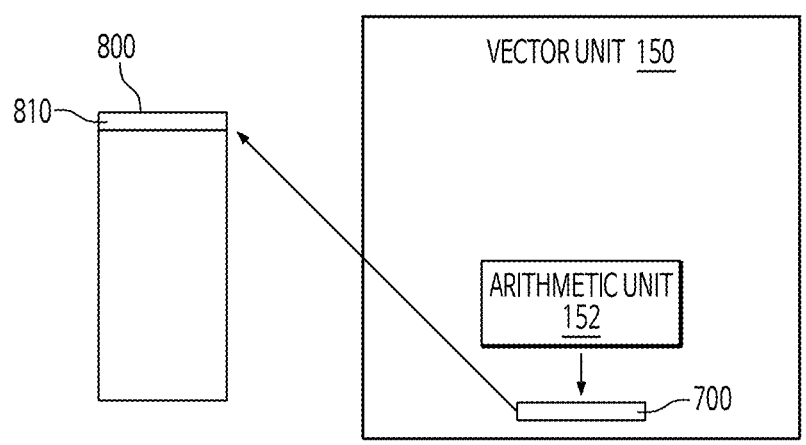
FIG. 8 is a diagram provided to explain a method for accumulating multiplication results in an output matrix.

FIG. 8 is a diagram provided to explain a method for accumulating multiplication results in an output matrix. Referring to FIG. 8, the vector unit 150 may apply, to the third matrix, the vector multiplication result 700 obtained by multiplying the value of the non-zero vector element included in the first vector data 300 by the second vector data 610 to 650 and accumulating the multiplication results, and output a third data set 800 represented as the third matrix. For example, in continuation of the process of vector multiplication described above with reference to FIG. 7, the vector unit 150 may accumulate the vector multiplication result 700, which is obtained by multiplying the value of the non-zero vector element included in the first vector data 300 by the second vector data 610 to 650 and accumulating the multiplication results, in vector data 810 associated with a row of the rows of the third matrix that corresponds to the first vector data 300. In other words, if the first vector data 300 is associated with the n-th row (n is a natural number) of the first sparse matrix, the vector multiplication result 700 may be accumulated in the vector data 810 of the n-th row of the rows of the third matrix.

Figure 9:
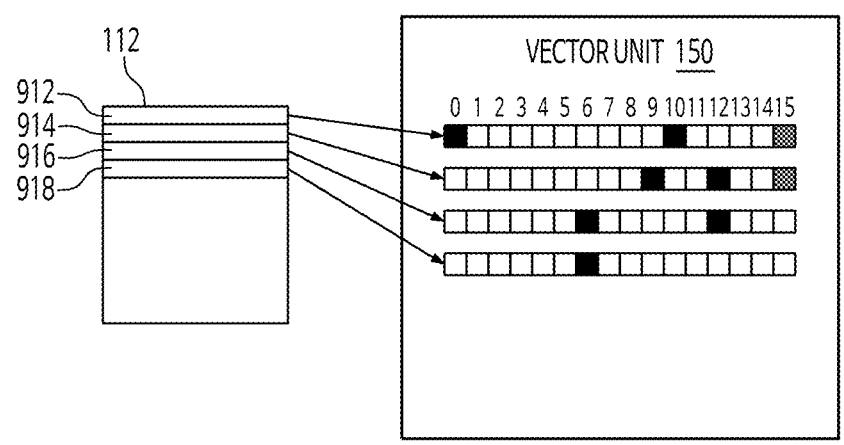
FIG. 9 is a diagram provided to explain a method for loading a plurality of vector data associated with a plurality of rows of the first sparse matrix into the vector unit.

FIG. 9 is a diagram provided to explain a method for loading a plurality of vector data associated with a plurality of rows of the first sparse matrix into the vector unit. In FIGS. 9 to 12, since the process of loading the vector data associated with the rows of matrices into the vector unit 150 is repeatedly performed as in a loop, an example of applying a loop unrolling function to improve the speed of memory access and operation will be described below.

Referring to FIG. 9, the memory load unit 130 may load into the vector unit 150 vector data 912 to 918 associated with a plurality of rows of the first sparse matrix from the first data set 112. For example, the memory load unit 130 may load into the vector unit 150 at least one fourth vector data 914, 916, and 918 associated with a row different from the n-th row from the first data set 112, together with the first vector data 912 associated with the n-th row (n is a natural number) of the first sparse matrix. The at least one fourth vector data 914, 916, and 918 may include vector data associated with a row adjacent to the row of the rows of the first sparse matrix that corresponds to the first vector data 912. For example, if the first vector data 912 is vector data associated with the n-th row of the first sparse matrix, the at least one fourth vector data 914, 916, and 918 may include vector data associated with the n+1-th row, vector data associated with the n+2-th row, and/or vector data associated with the n+3-th row. Meanwhile, the number of the at least one fourth vector data 914, 916, and 918 is not limited to the above.

For continuity with the operation process described above with reference to FIGS. 10 to 12, an example of the first vector data 912 and the at least one fourth vector data 914, 916, and 918 will be described in detail below, but this is only an example, and the number and value of the vector elements included in the first vector data 912 and the at least one fourth vector data 914, 916, and 918 are not limited thereto. The first vector data 912 and the at least one fourth vector data 914, 916, and 918 may include, for example, 16 vector elements, and the vector elements may be set to indices 0 to 15 in order from the first vector element. In addition, as illustrated in FIG. 9, a vector element darker in color (closer to black) represents a larger value, and a vector element brighter in color (closer to white) represents a smaller value. For example, among the vector elements included in the first vector data 912, the values of the first vector element (index 0), the eleventh vector element (index 10), and the sixteenth vector element (index 15) expressed in dark colors may be greater than or equal to a specified value, and the values of the remaining vector elements expressed in white may represent 0. Likewise, among the vector elements included in the first fourth vector data 914 of the at least one fourth vector data 914, 916, and 918, the values of the tenth vector element (index 9), the thirteenth vector element (index 12), and the sixteenth vector element (index 15) expressed in dark colors may be greater than or equal to a specified value, and the values of the remaining vector elements expressed in white may be 0, and, among the vector elements included in the second fourth vector data 916 of the at least one fourth vector data 914, 916, and 918, the values of the seventh vector element (index 6) and the thirteenth vector element (index 12) expressed in dark colors may be greater than or equal to a specified value, and the values of the remaining vector elements expressed in white may be 0, and, among the vector elements included in the third fourth vector data 918 of the at least one fourth vector data 914, 916, and 918, the value of the seventh vector element (index 6) expressed in dark color may be greater than or equal to a specified value, and the values of the remaining vector elements expressed in white may be 0.

Figure 10:
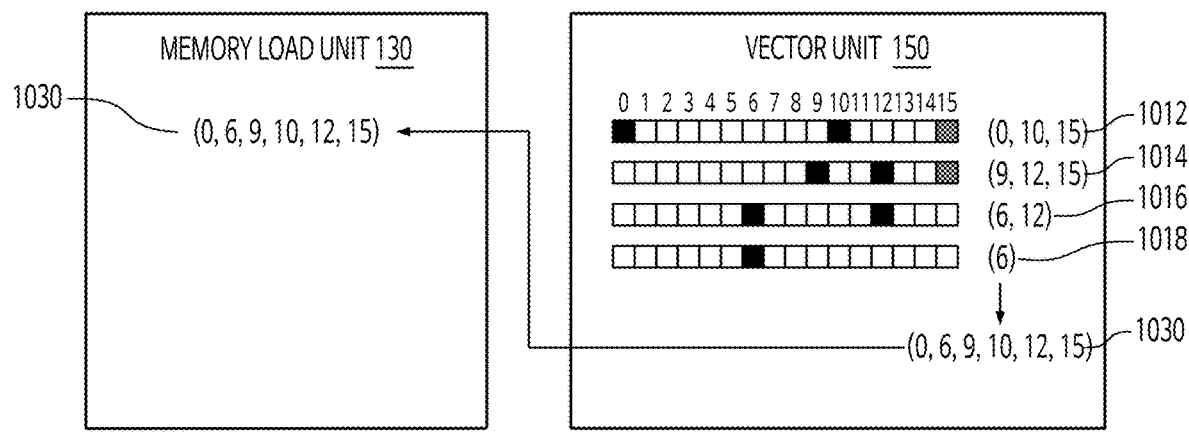
FIG. 10 is a diagram provided to explain a method for transmitting, to the memory load unit, the indices corresponding to the order of non-zero vector elements in a plurality of vector data.

FIG. 10 is a diagram provided to explain a method for transmitting, to the memory load unit, the indices corresponding to the order of non-zero vector elements in a plurality of vector data. Referring to FIG. 10, when the loop unrolling function is performed, the vector unit 150 may integrate indices corresponding to the order of non-zero vector elements included in the plurality of loaded vector data 912 to 918. In more detail, the vector unit 150 may identify a plurality of indices 1012 to 1018 corresponding to the order of non-zero vector elements included in each of the loaded plurality of vector data 912 to 918. For example, in continuation of the process of loading the plurality of vector data 912 to 918 described above with reference to FIG. 9, the vector unit 150 may identify the indices 0, 10, and 15 of the first, eleventh and sixteenth non-zero vector elements included in the first vector data 912 as the first index 1012. Likewise, the vector unit 150 may identify the indices 9, 12, and 15 of the tenth, thirteenth, and sixteenth non-zero vector elements included in the first fourth vector data 914 as the second index 1014, identify the indices 6 and 12 of the seventh and thirteenth non-zero vector elements included in the second fourth vector data 916 as the third indices 1016, and identify the index 6 of the seventh non-zero vector element included in the third fourth vector data 918 as the fourth index 1018.

The vector unit 150 may generate fifth vector data 1030 including a plurality of vector elements each having the plurality of indices 1012 to 1018 as their values in a non-overlapping manner. For example, the vector unit 150 may generate the fifth vector data 1030 including a first vector element having the first index 1012 as its value, a second vector element having the second index 1014 as its value, a third vector element having the third indices 1016 as its value, and a fourth vector element having the fourth index 1018 as its value in a non-overlapping manner. For example, the fifth vector data 1030 may include six vector elements each having values of 0, 6, 9, 10, 12, and 15 as their values. The vector unit 150 may transmit the generated fifth vector data 1030 to the memory load unit 130.

The vector unit 150 may apply a threshold to the plurality of loaded vector data 912 to 918. For example, if the plurality of vector data 912 to 918 associated with a plurality of rows of the first sparse matrix is loaded from the first data set 112, the vector unit 150 may apply a threshold to the plurality of vector data 912 to 918. Since the process of applying the threshold to the plurality of vector data 912 to 918 is the same as or similar to the process of applying the threshold to the vector data described above with reference to FIG. 4, redundant description thereof will be omitted.

Figure 11:
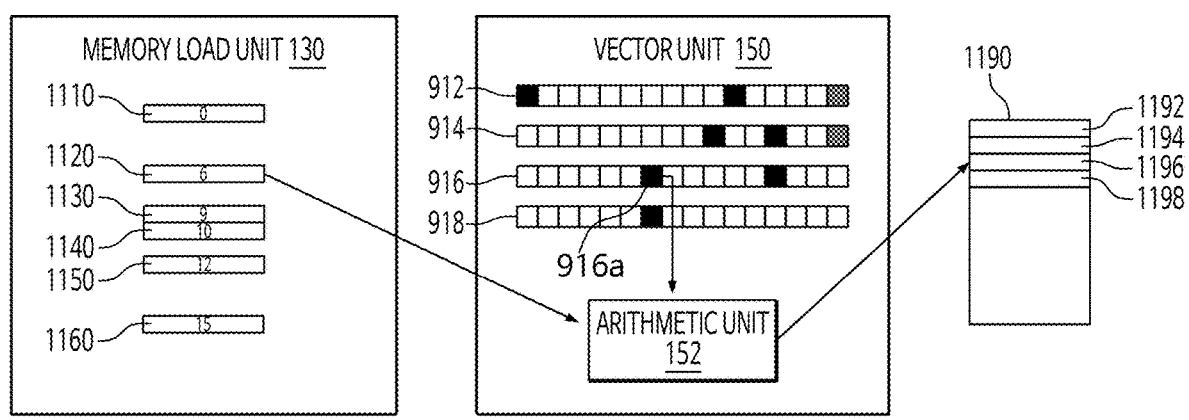
FIG. 11 is a diagram provided to explain a method for multiplying a value of a non-zero vector element of the vector data of the first sparse matrix by the vector data of the second matrix and accumulating the multiplication results in the output matrix.

FIG. 11 is a diagram provided to explain a method for multiplying a value of a non-zero vector element of the vector data of the first sparse matrix by the vector data of the second matrix and accumulating the multiplication results in the output matrix. Referring to FIG. 11, in response to receiving the fifth vector data 1030, the memory load unit 130 may load into the vector unit 150 second vector data 1110 to 1160 associated with the row of the second matrix that corresponds to the values of the vector elements of the fifth vector data 1030 from the second data set 114. For example, in continuation of the process of generating and transmitting the fifth vector data 1030 described above with reference to FIG. 10, the memory load unit 130 may load into the vector unit 150 a plurality of second vector data 1110 to 1160 associated with the first row (corresponding to zero in order), the seventh row (corresponding to six in order), the tenth row (corresponding to nine in order), the eleventh row (corresponding to ten in order), the thirteenth row (corresponding to twelve in order), and the sixteenth row (corresponding to fifteen in order) of the second matrix corresponding to 0, 6, 9, 10, 12, and 15, respectively, which are the values of the vector elements of the fifth vector data 1030.

The vector unit 150 may perform operations on the loaded data using the arithmetic unit 152. The vector unit 150 may multiply the values of non-zero vector elements included in the first vector data 912 associated with the plurality of rows of the first sparse matrix and in the at least one fourth vector data 914 to 918 by the second vector data 1110 to 1160. For example, the vector unit 150 may multiply the value of the first non-zero vector element included in the first vector data 912 by the first second vector data 1110 of the plurality of second vector data 1110 to 1160, multiply the value of the eleventh non-zero vector element included in the first vector data 300 by the fourth second vector data 1140 of the plurality of second vector data 1110 to 1160, and multiply the value of the sixteenth non-zero vector element included in the first vector data 300 by the sixth second vector data 1160 of the plurality of second vector data 1110 to 1160. The vector unit 150 may accumulate the vector multiplication results, which is obtained by multiplying the value of the non-zero vector element included in the first vector data 912 by the second vector data 1110 to 1160 and accumulating the multiplication results, in vector data 1192 associated with a row of the rows of the third matrix that corresponds to the first vector data 912.

Likewise, the vector unit 150 may multiply the value of the tenth non-zero vector element included in the first fourth vector data 914 by the third second vector data 1130 of the plurality of second vector data 1110 to 1160, multiply the value of the thirteenth non-zero vector element included in the first fourth vector data 914 by the fifth second vector data 1150 of the plurality of second vector data 1110 to 1160, and multiply the value of the sixteenth non-zero vector element included in the first fourth vector data 914 by the sixth second vector data 1160 of the plurality of second vector data 1110 to 1160. The vector unit 150 may accumulate the vector multiplication result, which is obtained by multiplying the value of the non-zero vector element included in the first fourth vector data 914 by the second vector data 1110 to 1160 and accumulating the multiplication results, in vector data 1194 associated with a row of the rows of the third matrix that corresponds to the first fourth vector data 914.

Likewise, the vector unit 150 may multiply the value of the seventh non-zero vector element included in the second fourth vector data 916 by the second vector data 1120 of the plurality of second vector data 1110 to 1160, and multiply the value of the thirteenth non-zero vector element included in the second fourth vector data 916 by the fifth second vector data 1150 of the plurality of second vector data 1110 to 1160. The vector unit 150 may accumulate the vector multiplication result, which is obtained by multiplying the value of the non-zero vector element included in the second fourth vector data 916 by the second vector data 1110 to 1160 and accumulating the multiplication results, in vector data 1196 associated with a row of the rows of the third matrix that corresponds to the second fourth vector data 916.

Likewise, the vector unit 150 may multiply the value of the seventh non-zero vector element included in the third fourth vector data 918 by the second vector data 1120 of the plurality of second vector data 1110 to 1160. The vector unit 150 may accumulate the vector multiplication result, which is obtained by multiplying the value of the non-zero vector element included in the third fourth vector data 918 by the second vector data 1110 to 1160 and accumulating the multiplication results, in vector data 1198 associated with a row of the rows of the third matrix that corresponds to the third fourth vector data 918.

The vector unit 150 may output a third data set 1190 represented as the third matrix.

The operation of multiplying the value of the non-zero vector elements included in the first vector data 912 associated with the plurality of rows of the first sparse matrix and in the at least one fourth vector data 914 to 918 by the second vector data 1110 to 1160 may be performed in parallel. For example, the operation of multiplying the values of the non-zero vector elements included in the first vector data 912 by the second vector data 1110 to 1160, and the operation of multiplying the values of the non-zero vector elements included in the at least one fourth vector data 914 to 918 by the second vector data 1110 to 1160 may be performed in parallel. Even if the at least one fourth vector data 914 to 918 includes a plurality of fourth vector data, the vector multiplication operations may be performed in parallel.

Figure 12:
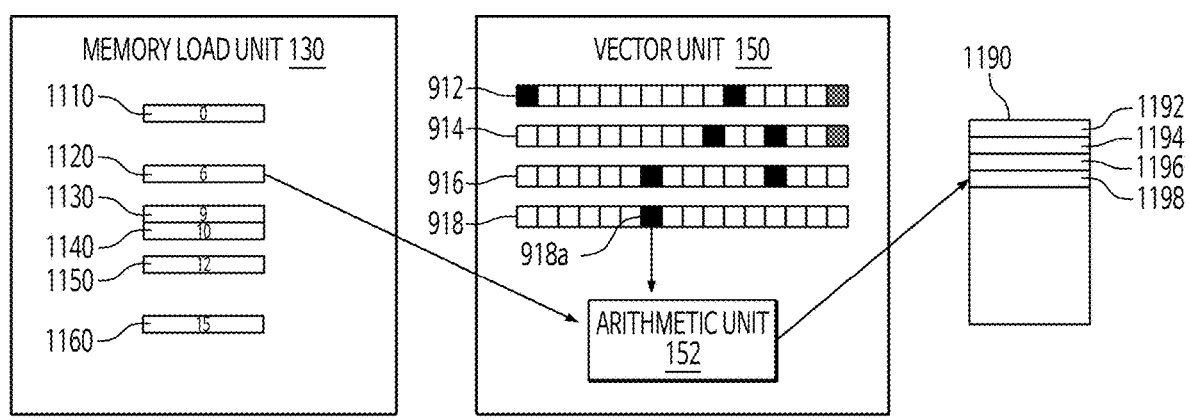
FIG. 12 is a diagram provided to explain a method for reusing the vector data of the second matrix if the indices corresponding to the order of non-zero vector elements of the vector data of the first sparse matrix are the same.

FIG. 12 is a diagram provided to explain a method for reusing the vector data of the second matrix if the indices corresponding to the order of non-zero vector elements of the vector data of the first sparse matrix are the same. Referring to FIG. 12, the vector unit 150 may reuse the second vector data 1110 to 1160 associated with the row of the second matrix loaded into the vector unit 150, if the indices corresponding to the order of non-zero vector elements of the plurality of vector data 912 to 918 associated with the row of the first sparse matrix loaded into the vector unit 150 are the same. For example, as illustrated in FIGS. 11 and 12, since the index corresponding to the order of a seventh non-zero vector element 916a included in the second fourth vector data 916 and the index corresponding to the order of a seventh non-zero vector element 918a included in the third fourth vector data 918 are the same as each other, the vector unit 150 may reuse the second second vector data 1120 of the plurality of second vector data 1110 to 1160 when performing the vector multiplication operation. Accordingly, it is possible to improve the speed of memory access and operation for the data set represented as the second matrix, thereby enabling efficient matrix operations.

Figure 13:
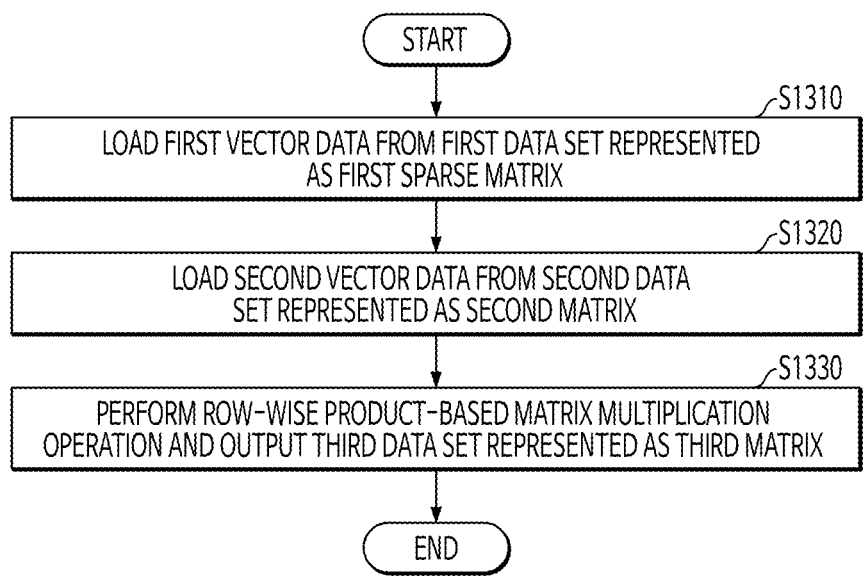
FIG. 13 is a diagram provided to explain a data operation method.

FIG. 13 is a diagram provided to explain a data operation method. Referring to FIG. 13, the data operation device (e.g., the data operation device 100 of FIG. 1) may load the first vector data from the first data set (e.g., from the first data set 112 of FIG. 1) represented as the first sparse matrix, at S1310. For example, the memory load unit (e.g., the memory load unit 130 of FIG. 1) of the data operation device may load into the vector unit (e.g., the vector unit 150 of FIG. 1) the first vector data associated with the row of the first sparse matrix from the first data set stored in at least one memory (e.g., the memory 110 of FIG. 1) and represented as the first sparse matrix.

The data operation device may apply the threshold to first vector data loaded into the vector unit. For example, the vector unit of the data operation device may set the value of the vector element included in the first vector data to zero, if the vector element is less than a specified value (e.g., a threshold).

At S1320, the data operation device may load the second vector data from the second data set (e.g., the second data set 114 in FIG. 1) represented as the second matrix. For example, the memory load unit of the data operation device may load into the vector unit the second vector data associated with a row of the second matrix that corresponds to the order of non-zero vector elements in the first vector data from the second data set stored in at least one memory (e.g., the memory 110 in FIG. 1) and represented as the second matrix.

At S1330, the data operation device may perform a row-wise product-based matrix multiplication operation and output a third data set represented as a third matrix. For example, the vector unit of the data operation device may use an arithmetic unit (e.g., the arithmetic unit 152 in FIG. 1) to multiply the values of the non-zero vector elements included in the first vector data by the second vector data and accumulate the multiplication results in the vector data of a row of the rows of the third matrix that corresponds to the first vector data. In more detail, if the first vector data associated with the n-th row (n is a natural number) of the first sparse matrix is loaded and if any of the vector elements of the loaded first vector data that corresponds to the m-th order (or column) (m is a natural number) has a non-zero value, the second vector data associated with the m-th row of the rows of the second matrix may be loaded into the vector unit. In this case, the vector unit may multiply the values of the non-zero vector elements included in the first vector data, that is, the vector elements corresponding to the m-th order, by the second vector data and accumulate the multiplication results in the vector data of the row (that is, the n-th row) of the rows of the third matrix that corresponds to the first vector data. The vector unit may output the third data set represented as the third matrix.

Figure 14:
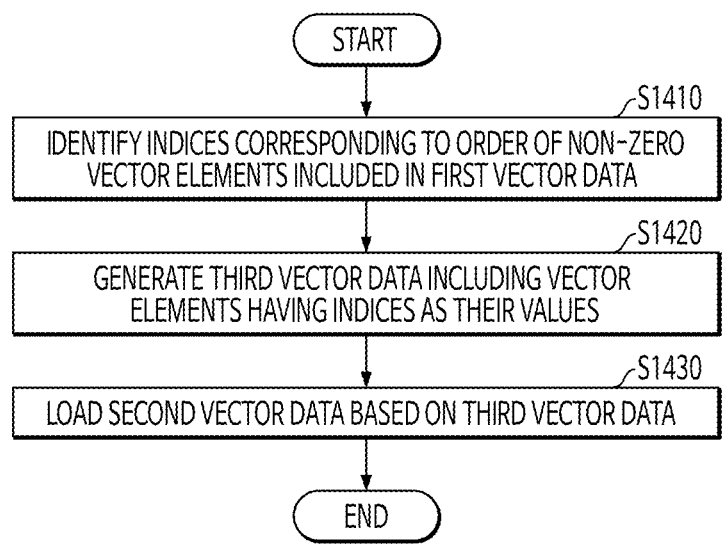
FIG. 14 is a diagram provided to explain a method for loading the vector data associated with the row of the second matrix using indices corresponding to the order of non-zero vector elements in the vector data associated with the row of the first sparse matrix.

FIG. 14 is a diagram provided to explain a method for loading the vector data associated with the row of the second matrix using indices corresponding to the order of non-zero vector elements in the vector data associated with the row of the first sparse matrix. Referring to FIG. 14, the data operation device (e.g., the data operation device 100 of FIG. 1) may load the first vector data from the first data set (e.g., from the first data set 112 of FIG. 1) represented as the first sparse matrix. For example, the memory load unit (e.g., the memory load unit 130 of FIG. 1) of the data operation device may load into the vector unit (e.g., the vector unit 150 of FIG. 1) the first vector data associated with the row of the first sparse matrix from the first data set stored in at least one memory (e.g., the memory 110 of FIG. 1) and represented as the first sparse matrix.

At S1410, the data operation device may identify the indices corresponding to the order of non-zero vector elements included in the first vector data. For example, if the first vector data associated with the row of the first sparse matrix is loaded from the first data set, the vector unit of the data operation device may identify the indices corresponding to the order of non-zero vector elements included in the first vector data.

Before identifying the indices, the vector unit may apply a threshold to the first vector data. For example, the vector unit may apply the threshold to the first vector data before identifying the indices corresponding to the order of the non-zero vector elements included in the first vector data. Accordingly, a non-zero vector element in the first data set having a value less than a specified value may not be identified with an index.

At S1420, the data operation device may generate the third vector data including the vector elements having the indices as their values. For example, the vector unit of the data operation device may generate the third vector data including the vector elements having the identified indices as their values. The vector unit may transmit the generated third vector data to the memory load unit of the data operation device.

At S1430, the data operation device may load the second vector data based on the third vector data. For example, in response to receiving the third vector data, the memory load unit of the data operation device may load into the vector unit the second vector data associated with the row of the second matrix that corresponds to the values of the vector elements of the third vector data from the second data set (e.g., the second data set 114 in FIG. 1) stored in at least one memory (e.g., the memory 110 in FIG. 1).

Figure 15:
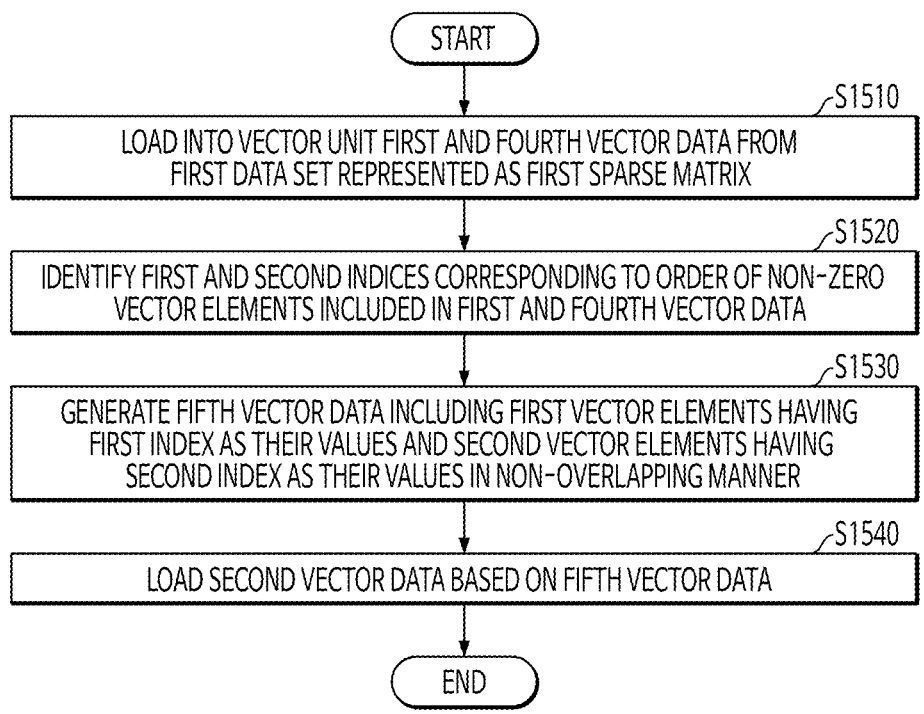
FIG. 15 is a diagram provided to explain a method for loading the vector data associated with the row of the second matrix using the indices corresponding to the order of non-zero vector elements in a plurality of vector data associated with a plurality of rows of the first sparse matrix.

FIG. 15 is a diagram provided to explain a method for loading the vector data associated with the row of the second matrix using the indices corresponding to the order of non-zero vector elements in a plurality of vector data associated with a plurality of rows of the first sparse matrix. Referring to FIG. 15, since the process of loading the vector data associated with the rows of the matrices into the vector unit (e.g., the vector unit 150 of FIG. 1) is repeatedly performed as in a loop, a loop unrolling function may be performed to improve the speed of memory access and operation.

At S1510, the data operation device (e.g., the data operation device 100 of FIG. 1) may load the first and fourth vector data from the first data set (e.g., the first data set 112 of FIG. 1) represented as the first sparse matrix. For example, the memory load unit of the data operation device (e.g., the memory load unit 130 of FIG. 1) may load into the vector unit the first vector data associated with any one row of the first sparse matrix from the first data set stored in at least one memory (e.g., the memory 110 of FIG. 1) and represented as the first sparse matrix, and load into the vector unit the fourth vector data associated with another row of the first sparse matrix from the first data set together with the first vector data.

The memory load unit may load a plurality of vector data associated with a plurality of rows of the first sparse matrix from the first data set into the vector unit. For example, the memory load unit may load into the vector unit at least one fourth vector data associated with a row different from the n-th row from the first data set, together with the first vector data associated with the n-th row (n is a natural number) of the first sparse matrix. The at least one fourth vector data may include vector data associated with a row adjacent to the row of the rows of the first sparse matrix that corresponds to the first vector data. For example, if the first vector data is vector data associated with the n-th row of the first sparse matrix, the at least one fourth vector data may include vector data associated with the n+1-th row, vector data associated with the n+2-th row, and/or vector data associated with the n+3-th row. However, the number of the at least one fourth vector data is not limited thereto.

At S1520, the data operation device may identify first and second indices corresponding to the order of non-zero vector elements included in the first and fourth vector data. For example, the vector unit of the data operation device may identify the first index corresponding to the order of non-zero vector elements included in the first vector data and identify the second index corresponding to the order of non-zero vector elements included in the fourth vector data.

The vector unit may identify a plurality of indices corresponding to the order of non-zero vector elements included in each of a plurality of vector data loaded into the vector unit. For example, if the number of plurality of vector data loaded into the vector unit is n (n is a natural number), the vector unit may identify n indices corresponding to each of the plurality of vector data.

Before identifying the indices, the vector unit may apply a threshold to each of the plurality of vector data loaded into the vector unit. For example, a threshold may be applied to the plurality of vector data (e.g., the first vector data and the at least one fourth vector data) before the vector unit identifies the indices corresponding to the order of non-zero vector elements included in the plurality of vector data (e.g., the first vector data and the at least one fourth vector data). Accordingly, a non-zero vector element in the first data set having a value less than a specified value may not be identified with an index.

At S1530, the data operation device may generate fifth vector data including first vector elements having the first index as their values and second vector elements having the second index as their values in a non-overlapping manner. For example, the vector unit of the data operation device may generate the fifth vector data including the first vector elements having the first index as their values and the second vector elements having the second index as their values, but the fifth vector data may include either the first vector elements or the second vector elements only, if the first vector elements and the second vector elements have the same value.

The vector unit may generate the fifth vector data including a plurality of vector elements having each of a plurality of indices as their values in a non-overlapping manner. For example, the vector unit may integrate indices corresponding to the order of non-zero vector elements included in the plurality of loaded vector data such that the element values are not equal to each other. The vector unit may transmit the generated fifth vector data to the memory load unit of the data operation device.

At S1540, the data operation device may load the second vector data based on the fifth vector data. For example, in response to receiving the fifth vector data, the memory load unit of the data operation device may load into the vector unit the second vector data associated with the row of the second matrix that corresponds to the values of the vector elements of the fifth vector data from the second data set (e.g., the second data set 114 in FIG. 1) stored in at least one memory (e.g., the memory 110 in FIG. 1).

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A data operation device, comprising:
    at least one memory configured to store a first data set represented as a first sparse matrix and a second data set represented as a second matrix;
    a vector unit configured to perform a row-wise product-based matrix multiplication operation based on the first sparse matrix and the second matrix and output a third data set represented as a third matrix; and
    a memory load unit configured to load into the vector unit first vector data associated with a row of the first sparse matrix from the first data set, and second vector data associated with a row of the second matrix that corresponds to an order of non-zero vector elements included in the first vector data from the second data set, and
    wherein the first data set includes a value of 0 in the first sparse matrix.

2. The data operation device according to claim 1, wherein, for the first data set, a sum of values of all vector elements included in vector data associated with any one row of the first sparse matrix is 1.

3. The data operation device according to claim 1, wherein the vector unit is configured to:
    in response to loading the first vector data, identify indices corresponding to the order of non-zero vector elements included in the first vector data;
    generate third vector data including vector elements having the identified indices as their values; and
    transmit the third vector data to the memory load unit, and
    wherein the indices correspond to an order of non-zero vector elements included in the first vector data that have values equal to or greater than a specified value.

4. The data operation device according to claim 1, wherein the vector unit is configured to:
    in response to loading the first vector data, identify indices corresponding to the order of non-zero vector elements included in the first vector data;
    generate third vector data including vector elements having the identified indices as their values; and
    transmit the third vector data to the memory load unit, and
    wherein the memory load unit is configured to, in response to receiving the third vector data, load into the vector unit the second vector data associated with a row of the second matrix that corresponds to values of the vector elements of the third vector data from the second data set.

5. The data operation device according to claim 1, wherein the memory load unit is configured to load into the vector unit fourth vector data associated with a row different from the row of the first sparse matrix from the first data set together with the first vector data.

6. The data operation device according to claim 5, wherein the vector unit is configured to:
    identify a first index corresponding to the order of the non-zero vector elements included in the first vector data;
    identify a second index corresponding to an order of non-zero vector elements included in the fourth vector data;
    generate fifth vector data including a first vector element having the first index as its value and a second vector element having the second index as its value, wherein the fifth vector data includes either the first vector element or the second vector element only, if the first vector element and the second vector element have the same value; and
    transmit the fifth vector data to the memory load unit.

7. The data operation device according to claim 6, wherein
    the first index corresponds to an order of non-zero vector elements included in the first vector data that have values equal to or greater than a specified value, and
    the second index corresponds to an order of vector elements included in the fourth vector data that have values equal to or greater than the specified value.

8. The data operation device according to claim 6, wherein the memory load unit is configured to, in response to receiving the third vector data, load into the vector unit the second vector data associated with a row of the second matrix that corresponds to values of the vector elements of the third vector data from the second data set.

9. The data operation device according to claim 1, wherein the vector unit is configured to multiply values of the non-zero vector elements included in the first vector data by the second vector data and accumulate the multiplication results in vector data of a row of rows the third matrix that corresponds to the first vector data.

10. A data operation method executed by a data operation device comprising at least one memory and a vector unit, wherein the data operation method comprises:
    from a first data set stored in the at least one memory and represented as a first sparse matrix, loading first vector data associated with a row of the first sparse matrix into the vector unit;
    from a second data set stored in the at least one memory and represented as a second matrix, loading second vector data associated with a row of the second matrix corresponding to an order of non-zero vector elements included in the first vector data into the vector unit; and
    performing, through the vector unit, a row-wise product-based matrix multiplication operation based on the first sparse matrix and the second matrix and outputting a third data set represented as a third matrix, and
    wherein the first data set includes a value of 0 in the first sparse matrix.

11. The data operation method according to claim 10, wherein the loading the second vector data into the vector unit further comprises:
    identifying indices corresponding to the order of the non-zero vector elements included in the first vector data;
    generating third vector data including vector elements having the identified indices as their values; and
    loading the second vector data into the vector unit based on the third vector data, and wherein the indices correspond to an order of non-zero vector elements included in the first vector data that have values equal to or greater than a specified value.

12. The data operation method according to claim 10, wherein the loading the second vector data into the vector unit further comprises:
   identifying indices corresponding to the order of the non-zero vector elements included in the first vector data;
   generating third vector data including vector elements having the identified indices as their values; and
   loading the second vector data into the vector unit based on the third vector data, and
   wherein the loading the second vector data into the vector unit based on the third vector data comprises loading into the vector unit the second vector data associated with a row of the second matrix that corresponds to values of the vector elements of the third vector data from the second data set.

13. The data operation method according to claim 10, further comprising loading into the vector unit fourth vector data associated with a row different from the row of the first sparse matrix from the first data set together with the first vector data.

14. The data operation method according to claim 13, wherein the loading the second vector data into the vector unit comprises:
   identifying a first index corresponding to the order of non-zero vector elements included in the first vector data;
   identifying a second index corresponding to an order of non-zero vector elements included in the fourth vector data;
   generating fifth vector data including a first vector element having the first index as its value and a second vector element having the second index as its value in a non-overlapping manner; and
   loading the second vector data into the vector unit based on the fifth vector data.

15. The data operation method according to claim 14, wherein
   the first index corresponds to an order of non-zero vector elements included in the first vector data that have values equal to or greater than a specified value, and
   the second index corresponds to an order of vector elements included in the fourth vector data that have values equal to or greater than the specified value.

16. The data operation method according to claim 14, wherein the loading the second vector data into the vector unit based on the fifth vector data comprises loading into the vector unit the second vector data associated with a row of the second matrix that corresponds to values of the vector elements of the fifth vector data from the second data set.

17. The data operation method according to claim 10, wherein the outputting the third data set comprises multiplying values of the non-zero vector elements included in the first vector data by the second vector data and accumulating the multiplication results in vector data of a row of rows of the third matrix that corresponds to the first vector data.

\* \* \* \* \*